United States Patent
Mabuchi

(10) Patent No.: US 8,624,115 B2
(45) Date of Patent: Jan. 7, 2014

(54) WIRE HARNESS

(75) Inventor: Miyoshi Mabuchi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/303,213

(22) Filed: Nov. 23, 2011

(65) Prior Publication Data

US 2012/0125683 A1    May 24, 2012

(30) Foreign Application Priority Data

Nov. 24, 2010  (JP) .................................. 2010-261257

(51) Int. Cl.
*H01B 7/00*    (2006.01)

(52) U.S. Cl.
USPC .. 174/72 A; 174/135; 174/110 R; 174/137 R; 248/49; 248/68.1

(58) Field of Classification Search
USPC ............. 174/72 A, 36, 34, 72 TR, 88 R, 135, 174/117 F, 257, 137 R, 110 R; 248/49, 74.1, 248/68.1
See application file for complete search history.

(56) References Cited

U.S. PATENT DOCUMENTS

| | | | | |
|---|---|---|---|---|
| 3,911,201 A * | 10/1975 | Fry | ............................... | 174/72 A |
| 4,880,943 A * | 11/1989 | Kuzuno et al. | ............... | 174/72 A |
| 6,303,868 B1 * | 10/2001 | Kawai | .......................... | 174/128.1 |
| 6,469,252 B1 * | 10/2002 | Tanaka et al. | ............... | 174/117 F |
| 6,479,762 B2 * | 11/2002 | Kusaka | ....................... | 174/117 F |
| 6,635,825 B2 * | 10/2003 | Adachi | ........................ | 174/72 A |
| 6,861,591 B2 * | 3/2005 | Kusaka | .......................... | 174/257 |
| 7,504,579 B2 * | 3/2009 | Frank | ............................... | 174/36 |
| 7,507,908 B1 * | 3/2009 | Wu et al. | .................... | 174/110 R |
| 8,367,932 B2 * | 2/2013 | Matsumoto | ............... | 174/110 R |
| 2001/0020539 A1 | 9/2001 | Adachi | | |

FOREIGN PATENT DOCUMENTS

| JP | 7-143647 A | 6/1995 |
|---|---|---|
| JP | 2001239900 A | 9/2001 |

* cited by examiner

*Primary Examiner* — Angel R Estrada

(74) *Attorney, Agent, or Firm* — Sughrue Mion, PLLC

(57) ABSTRACT

A wire harness is provided. A bent portion is formed into a bent shape corresponding to a bent shape of a wire harness arrangement path on a vehicle body panel. An insulating coating of a plurality of wires constituting the bent portion or at least one of the wires has such a flexural rigidity that the bent portion has a rigidity for maintaining the bent shape thereof.

5 Claims, 7 Drawing Sheets

WIRE HARNESS

The disclosure of Japanese Patent Application No. 2010-261257 filed on Nov. 24, 2010, including specification, drawings and claims is incorporated herein by reference in its entirety.

BACKGROUND

The invention relates to a wire harness including a bent portion formed into a bent shape corresponding to a bent shape of a wire harness arrangement path on a vehicle body panel.

FIG. 6 illustrates a wire harness according to the related art. A wire harness 111 is arranged in a wire harness arrangement path set on a vehicle body panel 111 of a vehicle.

The vehicle body panel 111 of the illustrated example has an edge portion 112 having a substantially L shape. The edge portion 112 includes a burr or the like that may cause damage to wires when it is in contact with the wires in, e.g., a welding portion between the edge portion 112 and a metal plate.

The wire harness arrangement path is set in a substantially L shape on the vehicle body panel 111 around an outer side of the edge portion 112.

The wire harness 101 has a bent portion 102 formed around an outer side of a corner portion of the L-shaped edge portion 112. The wire harness 101 is held by clamp members 121 that fix at least both ends of the bent portion 102 to the vehicle body panel 111.

In the wire harness 101 according to the related art, insulated wires using a stranded conductor may be employed as a plurality of insulated wires constituting the wire harness. This is because the insulated wires using a stranded conductor have excellent flexibility compared to insulated wires using a single-wire conductor so that the wire harness can be easily bent in the wire shape corresponding to, e.g., a bent shape of the wire harness arrangement path.

Further, as illustrated in FIG. 6, in the wire harness 101 according to the related art, the bent portion 102 is covered with a protection member 131 in order to maintain the bent shape.

FIG. 7 illustrates a specific shape of the protection member 131. The protection member 131 disclosed in Patent Document 1 is a spiral tube wound on an outer periphery of a wire bundle 103 constituting the wire harness.

Both ends of the protection member 131 mounted on the bent portion 102 are fixed to the wire bundle by adhesive tapes 123 as shown in FIG. 6.

Further, there has been proposed a wire harness using a cylindrical protector as the protection member 131 (see, e.g., Patent Document 2).
Patent Document 1: JP-A-2001-239900
Patent Document 2: JP-A-7-143647

However, in the technologies disclosed in Patent Documents 1 and 2, the spiral tube or protector covering the wire bundle 103 caused a problem such as the large size and heavy weight of the wire harness.

Further, one having appropriate flexibility is employed as the wire bundle 103 in order to facilitate an operation of bending the wire harness to correspond to the bent shape of the wire harness arrangement path. Accordingly, if an installation distance between the clamp members 121 on which the wire harness is suspended is large, the wire bundle may be bent and interfere with the vehicle body panel due to vibration or the like when driving a vehicle, thereby causing a problem such as occurrence of unusual sound or damage.

SUMMARY

It is therefore an object of the present invention to provide a wire harness capable of achieving the small size and light weight of the wire harness by reducing the number of components, and preventing occurrence of unusual sound or damage of wires constituting the wire harness due to interference between the wires and a vehicle body panel.

The object of the present invention can be achieved by the following configurations of (1) to (4).

(1) A wire harness, comprising: a bent portion which is formed into a bent shape corresponding to a bent shape of a wire harness arrangement path on a vehicle body panel, wherein an insulating coating of a plurality of wires constituting the bent portion or at least one of the wires has such a flexural rigidity that the bent portion has a rigidity for maintaining the bent shape thereof.

(2) The wire harness according to (1), wherein a conductor of the at least one of the wires constituting the bent portion is a single-wire conductor, and wherein the single-wire conductor has such a flexural rigidity that the bent portion has the rigidity for maintaining the bent shape thereof.

(3) The wire harness according to (1), wherein the wires constituting the bent portion is a flat circuit, wherein the flat circuit includes: an insulation sheet film integrally formed into a bent shape corresponding to the bent shape of the wire harness arrangement path; and a plurality of conductors formed on the insulation sheet film, and wherein the insulation sheet film has such a flexural rigidity that the bent portion has the rigidity for maintaining the bent shape thereof.

(4) The wire harness according to claim 1, wherein a bending radius of a wire at an inner peripheral side of the bent portion is greater than a bending radius of a wire at an outer peripheral side of the bent portion such that a gap having substantially a crescent shape is formed between the wire at the inner peripheral side and the wire at the outer peripheral side, and wherein the wire at the inner peripheral side and the wire at the outer peripheral side are fixed to each other at both ends of the bent portion.

By the configuration of (1), the bent portion of the wire harness which is arranged on the vehicle body panel has a rigidity for maintaining the bent shape thereof and the rigidity is ensured by a flexural rigidity of the insulating coating of a plurality of wires constituting the bent portion or a flexural rigidity of the conductor of at least one of the wires. That is, the wire bundle itself retains the rigidity required for maintaining the bent shape of the bent portion.

Accordingly, the bent portion of the wire harness may prevent the wires from interfering with the surrounding vehicle body panel due to deformation of the bent shape even without using a protection member such as a spiral tube or a protector.

Thus, as compared to the wire harness according to the related art in which the protection member is mounted to protect the wire bundle of the bent portion, it is possible to achieve the small size and light weight of the wire harness by omitting the protection member.

Further, it is possible to avoid interference between the bent portion of the wire harness and the surrounding vehicle body panel by the rigidity of the wire bundle itself. As a result, it is also possible to prevent occurrence of unusual sound or damage of the wires constituting the wire harness due to interference between the wires and the vehicle body panel.

The wires using a single-wire conductor as a conductor have a significantly high flexural rigidity compared to the wires using a stranded conductor as a conductor.

Accordingly, by the configuration of (2), by setting the number of the wires using a single-wire conductor, it is possible to adjust the flexural rigidity of the wire bundle itself appropriately for maintaining the bent shape. Accordingly, it is possible to eliminate the need for installation of the protection member such as a spiral tube or a protector in order to maintain the bent shape of the bent portion.

The wires including the high rigidity core wire in the stranded conductor may have a high flexural rigidity compared to normal wires using, e.g., general copper wires as core wires of the stranded conductor by selecting a material or the like of the high rigidity core wire.

By the configuration of (3), since the bent portion of the wire harness is formed into a sheet shape, the arrangement of the wire harness on the wire harness arrangement path can be easily performed even when it is impossible to ensure a sufficient height for the wire harness arrangement path, thereby facilitating the arrangement of the wire harness.

By the configuration of (4), when, e.g., an external force for restoring the curve of the wire bundle is exerted on the wire bundle constituting the bent portion, a tensile load is applied to the inner peripheral side wire and a compressive load is applied to the outer peripheral side wire. Further, when an external force for increasing the curve of the wire bundle is exerted on the wire bundle, a compressive load is applied to the inner peripheral side wire and a tensile load is applied to the outer peripheral side wire. That is, when an external force for changing the curved shape of the wire bundle is exerted on the wire bundle, loads are applied in opposite directions to the inner peripheral side wire and the outer peripheral side wire, thereby providing an effect of suppressing a change in the curved shape to each other.

Further, in the configuration in which the gap having a substantially crescent shape is formed between the inner peripheral side and outer peripheral side wires, the effect of suppressing a change in the curved shape of the wire bundle is strongly applied to each other, thereby preventing a change in the curved shape of the wire bundle.

Accordingly, it is possible to surely prevent the wire bundle of the bent portion from being in contact with the vehicle body panel due to a change in the bent shape.

In the wire harness according to the invention, the bent portion of the wire harness which is arranged on the vehicle body panel has a rigidity for maintaining the bent shape thereof and the rigidity is ensured by a flexural rigidity of the insulating coating of a plurality of wires constituting the bent portion or a flexural rigidity of the conductor of at least one of the wires. That is, the wire bundle itself retains the rigidity required for maintaining the bent shape of the bent portion.

Accordingly, the bent portion of the wire harness may prevent the wires from interfering with the surrounding vehicle body panel due to deformation of the bent shape even without using a protection member such as a spiral tube or a protector.

Thus, as compared to the wire harness according to the related art in which the protection member is mounted to protect the wire bundle of the bent portion, it is possible to achieve the small size and light weight of the wire harness by omitting the protection member.

Further, it is possible to avoid interference between the bent portion of the wire harness and the surrounding vehicle body panel by the rigidity of the wire bundle itself. As a result, it is also possible to prevent occurrence of unusual sound or damage of the wires constituting the wire harness due to interference between the wires and the vehicle body panel.

DETAILED DESCRIPTION OF THE EMBODIMENTS

Hereinafter, a wire harness according to an embodiment of the invention will be described in detail with reference to the accompanying drawings.

Figure 1:
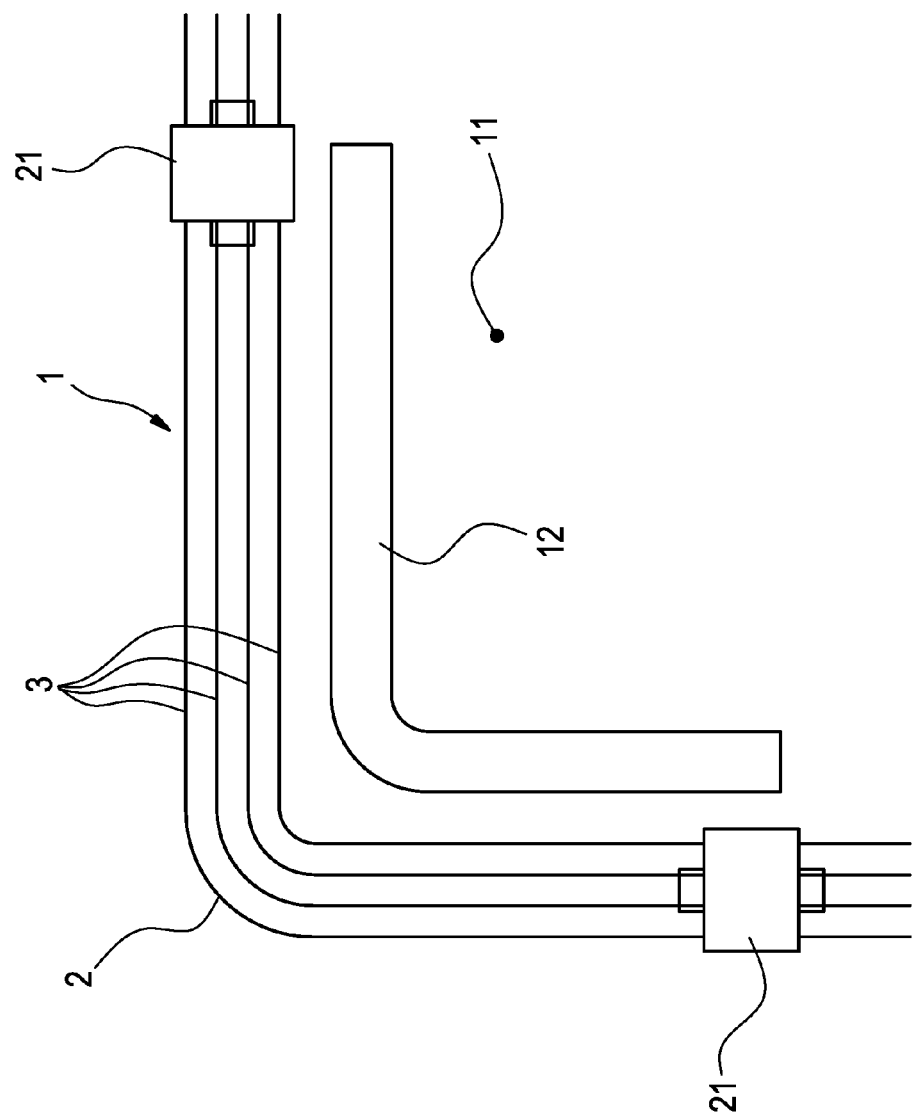
FIG. 1 schematically shows a configuration of a wire harness according to the embodiment of the invention.

FIG. 1 schematically shows a configuration of a wire harness according to the embodiment of the invention. A wire harness 1 of this embodiment is arranged in a wire harness arrangement path set on a vehicle body panel 11 of a vehicle.

The vehicle body panel 11 of the illustrated embodiment has an edge portion 12 having a substantially L shape. The edge portion 12 includes a burr or the like that may cause damage to wires when it is in contact with the wires in, e.g., a welding portion between the edge portion 12 and a metal plate.

The wire harness arrangement path is set on the vehicle body panel 11 in a substantially L shape around an outer side of the edge portion 12.

The wire harness 1 has a bent portion 2 formed around an outer side of a corner portion of the L-shaped edge portion 12. The bent portion 2 has a bent shape corresponding to the bent shape of the wire harness arrangement path on the vehicle body panel 11. Further, the wire harness 1 is held by clamp members 21 that fix at least both ends of the bent portion 2 to the vehicle body panel 11.

In this embodiment, the bent portion 2 has a rigidity for maintaining the bent shape in which the bent portion 2 is bent at a substantially right angle along the outer side of the corner portion of the edge portion 12 and the rigidity of the bent portion 2 is ensured by a flexural rigidity of a conductor in a plurality of wires 3 constituting the bent portion 2. In other words, at least one of the wires 3 has such a flexural rigidity that the bent portion 2 has the rigidity for maintaining the bent shape thereof.

Figure 2:
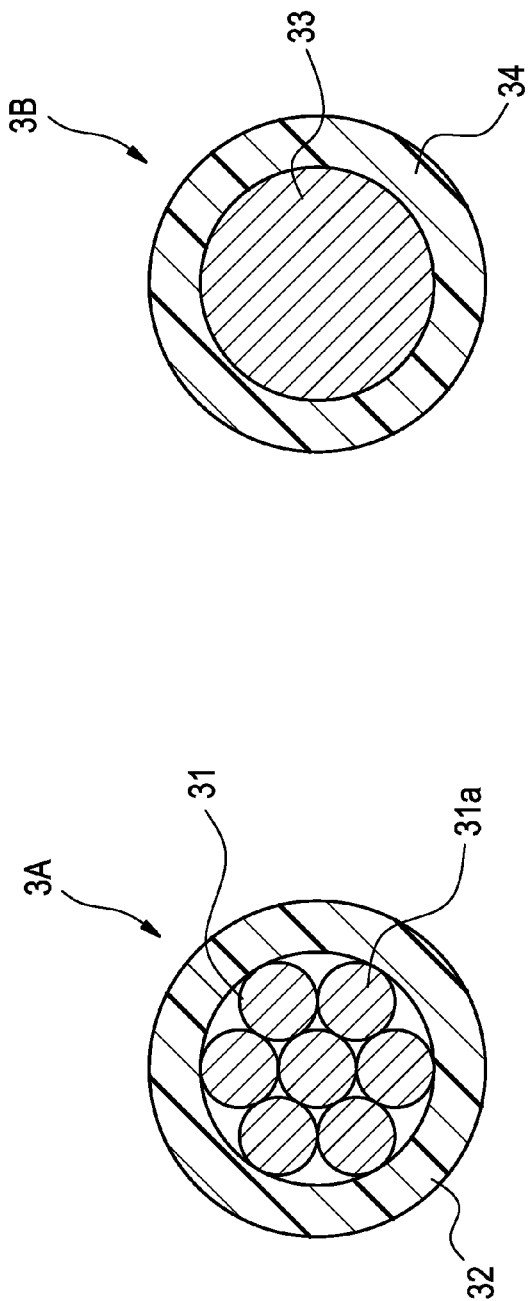
FIG. 2A is a transverse cross-sectional view showing general insulated wires in which a stranded conductor is covered with an insulating coating.
FIG. 2B is a transverse cross-sectional view showing high flexural rigidity insulated wires in which a single-wire conductor is covered with an insulating coating.

Generally, insulated wires 3A illustrated in FIG. 2A are used as the wires 3 constituting the bent portion 2. But in this embodiment, one or more insulated wires 3B illustrated in FIG. 2B are used as the wires 3 constituting the bent portion 2.

The insulated wires 3A illustrated in FIG. 2A have a structure in which a stranded conductor 31 formed by twisting a plurality of core wires 31a together is covered with an insulating coating 32.

On the other hand, the insulated wires 3B illustrated in FIG. 2B have a structure in which a single-wire conductor 33 is covered with an insulating coating 34.

The insulated wires 3B using the single-wire conductor 33 as a conductor have a significantly high flexural rigidity compared to the insulated wires 3A using the stranded conductor 31 as a conductor.

In this embodiment, by setting the number of the wires using the insulated wires 3B, it is possible to adjust the flexural rigidity of the wire bundle appropriately for maintaining the bent shape shown in FIG. 1. In other words, at least one of the wires 3 constituting the bent portion 2 is the insulated wire 3B comprised of the single-wire conductor 33. The number of the insulated wires 3B in the wires 3 may be changed depending on the required rigidity of the bent portion 2.

In the wire harness 1 of the above-described embodiment, the bent portion 2 of the wire harness 1 which is arranged on the vehicle body panel 11 has the rigidity for maintaining the bent shape thereof and the rigidity of the bent portion 2 is ensured by a flexural rigidity of the conductor of at least one of the wires 3 constituting the bent portion 2. In other words, the at least one single-wire conductor 33 used in the wires 3 has such a flexural rigidity that the bent portion 2 has the rigidity required for maintaining the bent shape thereof. Thus, the wire bundle itself retains the rigidity required for maintaining the bent shape of the bent portion 2.

Accordingly, the bent portion 2 of the wire harness 1 may prevent the wires 3 from interfering with the surrounding vehicle body panel 11 due to deformation of the bent shape even without using a protection member such as a spiral tube or a protector.

Thus, as compared to the wire harness according to the related art, in which the protection member is mounted to protect the wire bundle at the bent portion, it is possible to achieve the small size and light weight of the wire harness 1 by omitting the protection member.

Further, it is possible to avoid interference between the bent portion 2 of the wire harness 1 and the surrounding vehicle body panel 11 by the rigidity of the wire bundle itself. As a result, it is also possible to prevent occurrence of unusual sound or damage of the wires 3 constituting the wire harness 1 due to interference between the wires 3 and the vehicle body panel 11.

Further, in the wire harness 1 of the above-described embodiment, the number of the insulated wires 3B using the single-wire conductor 33 can be adjusted such that the wire bundle itself has the flexural rigidity enough to maintain the bent shape. In other words, by adjusting the number of the insulated wires 3B installed, it is possible to prevent the flexural rigidity from increasing unnecessarily to facilitate a bending process of the wire harness 1.

Moreover, the wire structure effective to increase the rigidity of the bent portion 2 is not limited to the structure of the insulated wires 3B illustrated in FIG. 2B.

Figure 3:
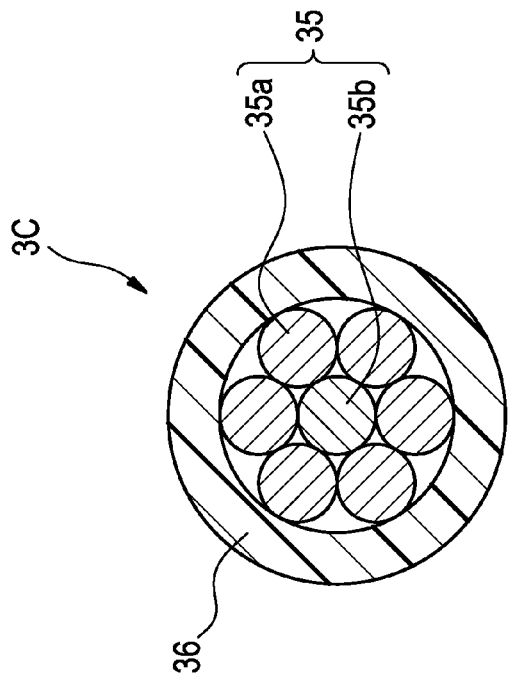
FIG. 3 is a transverse cross-sectional view showing insulated wires in which a plurality of core wires constituting a stranded conductor include a high rigidity core wire having a high flexural rigidity.

Insulated wires 3C having a structure illustrated in FIG. 3 may be used. The insulated wires 3C have a structure in which a stranded conductor 35 formed by twisting a plurality of core wires 35a and a high rigidity core wire 35b together is covered with an insulating coating 36.

The core wires 35a are general core wires such as copper wires. On the other hand, the high rigidity core wire 35b may be a steel wire or stainless steel wire, which has a higher flexural rigidity than that of the copper wires. Although only one high rigidity core wire 35b is included in the structure illustrated in FIG. 3, two or more high rigidity core wires 35b may be included in the structure.

The insulated wires 3C has a rigidity required for maintaining the bent shape of the bent portion 2 and the rigidity is ensured by the flexural rigidity of the high rigidity core wire 35b. In other words, the high rigidity core wire 35b has such a flexural rigidity that the bent portion 2 has the rigidity for maintaining the bent shape thereof.

In the bent portion 2 using the insulated wires 3C illustrated in FIG. 3, by setting the number of the insulated wires 3C to be mixed with the insulated wires 3A, it is possible to adjust the flexural rigidity of the wire bundle itself appropriately for maintaining the bent shape. Accordingly, it is possible to eliminate the need for installation of the protection member such as a spiral tube or a protector in order to maintain the bent shape of the bent portion 2.

Moreover, the rigidity for maintaining the bent shape of the bent portion 2 may be ensured by the rigidity of the insulating coating of the wires 3 constituting the bent portion 2. In other words, the insulating coating of the wires 3 constituting the bent portion may have such a flexural rigidity that the bent portion 2 has the rigidity required for maintaining the bent shape thereof.

For example, the insulating coating of the wires 3 constituting the bent portion 2 may be formed of resin having high flexural rigidity and thermoplasticity such that when it is cooled to a room temperature after deformation in a heated state, the deformation is not restored. Accordingly, the insulating coating of the wires 3 can surely have a higher rigidity than normal.

Figure 4:
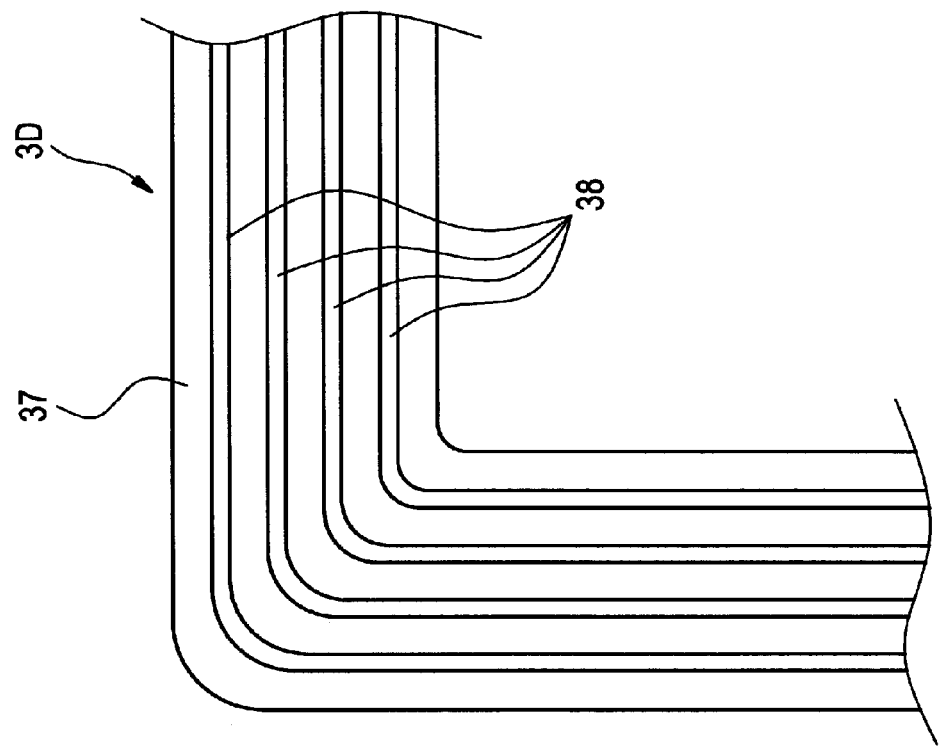
FIG. 4 is an explanatory diagram showing a flat circuit forming a bent portion of the wire harness.

Further, it is effective to employ a flat circuit 3D illustrated in FIG. 4 as the insulated wires in which the insulating coating has a rigidity for maintaining the bent shape.

The flat circuit 3D illustrated in FIG. 4 is a so-called "flexible printed circuit (FPC)" or "flexible flat cable (FFC)", in which a plurality of conductors 38 are printed on an insulation sheet film 37 which is integrally formed into a bent shape corresponding to the bent shape (L shape) of the wire harness arrangement path.

The flat circuit 3D has a rigidity required for maintaining the bent shape of the bent portion 2 and the rigidity of the flat circuit 3D is ensured by the L-shaped insulation sheet film 37. In other words, the insulation sheet film 37 has such a flexural rigidity that the bent portion 2 has the rigidity for maintaining the bent shape thereof.

With this configuration, since the bent portion 2 is formed into a sheet shape, it is possible to easily arrange the wire harness 1 using the flat circuit 3D illustrated in FIG. 4 on the wire harness arrangement path, even when the wire harness arrangement path does not have a sufficient height, thereby facilitating the arrangement of the wire harness 1.

Figure 5:
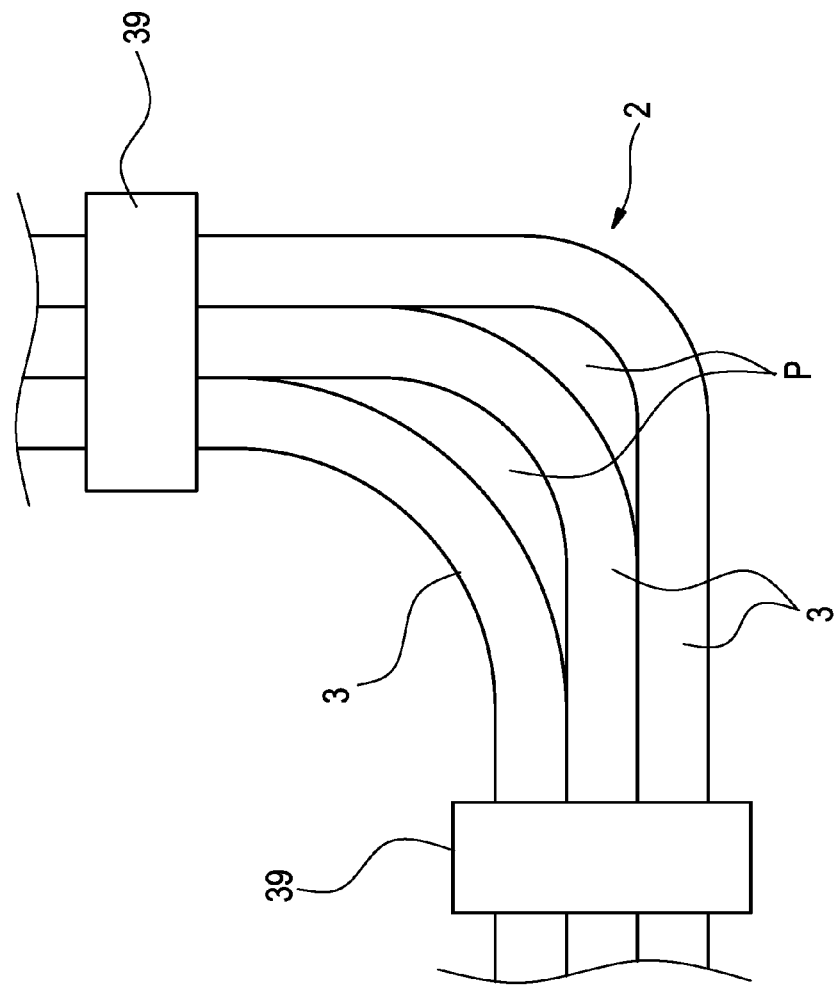
FIG. 5 is an explanatory diagram showing a bent portion with an improved flexural rigidity by forming a gap having a crescent shape between an inner peripheral side wire and an outer peripheral side wire in the bent portion.
Figure 6:
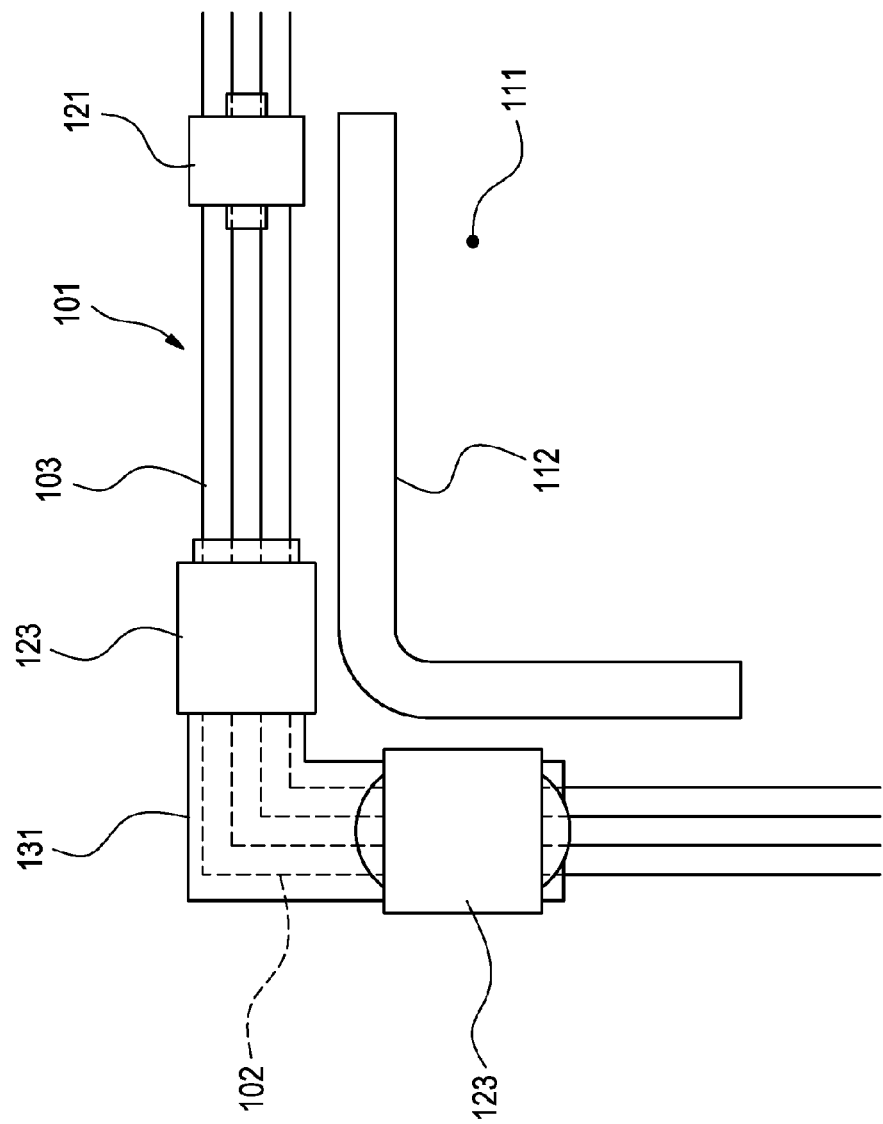
FIG. 6 is an explanatory diagram showing a bent portion of a wire harness according to the related art.
Figure 7:
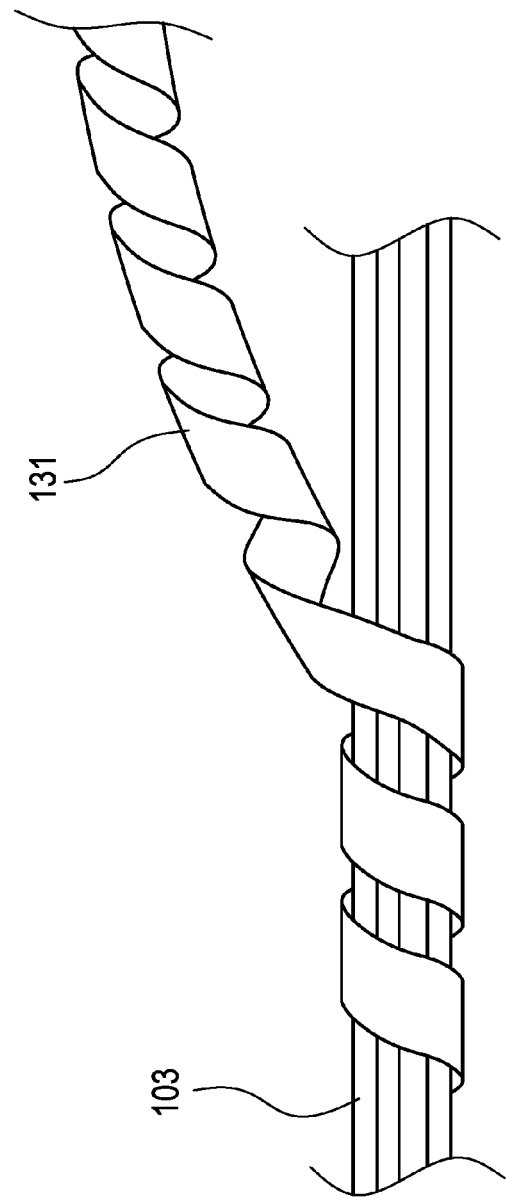
FIG. 7 is an explanatory diagram showing a spiral tube as a protection member for protecting the bent portion of the wire harness according to the related art.

The bent portion 2 may have a configuration illustrated in FIG. 5. That is, in the wires 3 constituting the bent portion 2, a bending radius of a wire 3 at an inner peripheral side of the bent portion 2 is greater than a bending radius of a wire 3 at an outer peripheral side of the bent portion 2 such that a gap P having a substantially crescent shape is formed between the inner peripheral side wire 3 and the outer peripheral side wire 3.

Further, the inner peripheral side wire 3 and the outer peripheral side wire 3 are fixed to each other with fixing means 39 at both ends of the bent portion 2.

The fixing means 39 may be configured by tape winding using an adhesive tape, welding between outer insulating covers of the wires, adhesion using an adhesive or the like.

In a case where the bent portion 2 of the wire harness 1 has the structure illustrated in FIG. 5, when, e.g., an external force for restoring the curve of the wire bundle is exerted on the wire bundle constituting the bent portion 2, a tensile load is applied to the inner peripheral side wire 3 and a compressive load is applied to the outer peripheral side wire 3. Further, when an external force for increasing the curve of the wire bundle is exerted on the wire bundle, a compressive load is applied to the inner peripheral side wire 3 and a tensile load is applied to the outer peripheral side wire 3. That is, when an external force for changing the curved shape of the wire bundle is exerted on the wire bundle, loads are applied in opposite directions to the inner peripheral side wire 3 and the outer peripheral side wire 3, thereby providing an effect of suppressing a change in the curved shape to each other.

Further, in the configuration in which the gap P having a substantially crescent shape is formed between the inner peripheral side and outer peripheral side wires 3, the effect of suppressing a change in the curved shape is strongly applied to each other, thereby preventing a change in the curved shape of the wire bundle.

Accordingly, it is possible to surely prevent the wire bundle of the bent portion 2 from being in contact with the vehicle body panel 11 due to a change in the bent shape.

The invention claimed is:

1. A wire harness, comprising:
a plurality of wires having a flexural rigidity,
wherein a bent portion of the plurality of wires having a bent shape corresponds to a bent shape of a wire harness arrangement path on a vehicle body panel, and
wherein the flexural rigidity of an insulating coating of the plurality of wires or the flexural rigidity of at least one of the wires maintains the bent shape of the bent portion of the plurality of wires.

2. The wire harness according to claim 1,
wherein a conductor of the at least one of the wires constituting the bent portion is a single-wire conductor, and
wherein the single-wire conductor has such a flexural rigidity that the bent portion has the rigidity for maintaining the bent shape thereof.

3. The wire harness according to claim 1,
wherein the wires constituting the bent portion is a flat circuit,
wherein the flat circuit includes:
an insulation sheet film integrally formed into a bent shape corresponding to the bent shape of the wire harness arrangement path; and
a plurality of conductors formed on the insulation sheet film, and
wherein the insulation sheet film has such a flexural rigidity that the bent portion has the rigidity for maintaining the bent shape thereof.

4. The wire harness according to claim 1,
wherein a bending radius of a wire at an inner peripheral side of the bent portion is greater than a bending radius of a wire at an outer peripheral side of the bent portion such that a gap having substantially a crescent shape is formed between the wire at the inner peripheral side and the wire at the outer peripheral side, and
wherein the wire at the inner peripheral side and the wire at the outer peripheral side are fixed to each other at both ends of the bent portion.

5. A wire harness, comprising:
a plurality of wires;
an insulating coating surrounding each of the plurality of wires; and
a means for maintaining a bent shape of the wire harness, the means comprising at least one of:
the insulating coating having a predetermined rigidity that maintains the bent shape; and
at least one of the wires having a predetermined rigidity that maintains the bent shape.

* * * * *